(12) United States Patent
Hashiguchi

(10) Patent No.: US 10,094,990 B2
(45) Date of Patent: Oct. 9, 2018

(54) OPTICAL MODULE

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/783,172

(22) Filed: Oct. 13, 2017

(65) Prior Publication Data
US 2018/0149816 A1  May 31, 2018

(30) Foreign Application Priority Data
Nov. 29, 2016 (JP) .................................. 2016-231302

(51) Int. Cl.
*G02B 6/42* (2006.01)
(52) U.S. Cl.
CPC ......... *G02B 6/4214* (2013.01); *G02B 6/4206* (2013.01); *G02B 6/4257* (2013.01)
(58) Field of Classification Search
None
See application file for complete search history.

(56) References Cited

U.S. PATENT DOCUMENTS

| | | | | |
|---|---|---|---|---|
| 4,652,082 A * | 3/1987 | Warner | ................ | G02B 6/3829 385/78 |
| 2003/0138223 A1* | 7/2003 | Sasaki | .................. | G02B 6/4214 385/93 |
| 2008/0175544 A1* | 7/2008 | Fujiwara | .............. | G02B 6/4292 385/77 |
| 2009/0297099 A1* | 12/2009 | Benjamin | ................ | G02B 6/25 385/32 |
| 2011/0317964 A1* | 12/2011 | Downs | ................. | G02B 6/4201 385/92 |
| 2013/0230280 A1* | 9/2013 | Kadar-Kallen | ...... | G02B 6/4204 385/33 |
| 2016/0161687 A1* | 6/2016 | Rosenberg | ........... | G02B 6/4292 385/14 |
| 2017/0075082 A1 | 3/2017 | Aihara et al. | | |

FOREIGN PATENT DOCUMENTS

JP      2015-219273      12/2015

OTHER PUBLICATIONS

U.S. Appl. No. 15/783,361 to Osamu Hashiguchi, filed Oct. 13, 2017.

* cited by examiner

*Primary Examiner* — Mike Stahl
(74) *Attorney, Agent, or Firm* — Greenblum & Bernstein, P.L.C.

(57) ABSTRACT

An optical module includes a first optical block, a second optical block, and a metal part. In a state that the metal part is assembled with the first optical block, the second optical block is sandwiched between the first optical block and the metal part. The metal part includes two spring pieces. The two spring pieces are along both lateral surfaces of the first optical block. Locking parts which are formed on both lateral surfaces of the first optical block are hooked on the two spring pieces. The second optical block is pressed against the first optical block in a direction, in which the metal part is assembled with the first optical block, by a spring force which is generated when the two spring pieces are hooked on the locking parts.

5 Claims, 14 Drawing Sheets

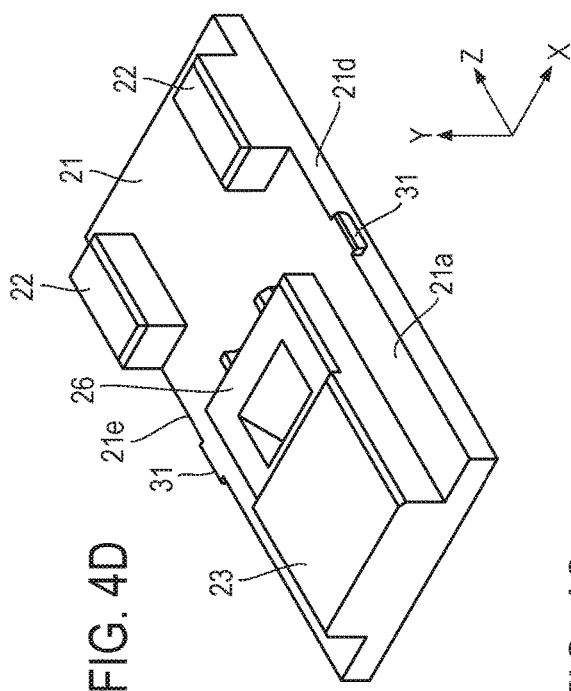
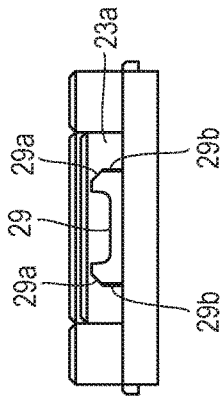
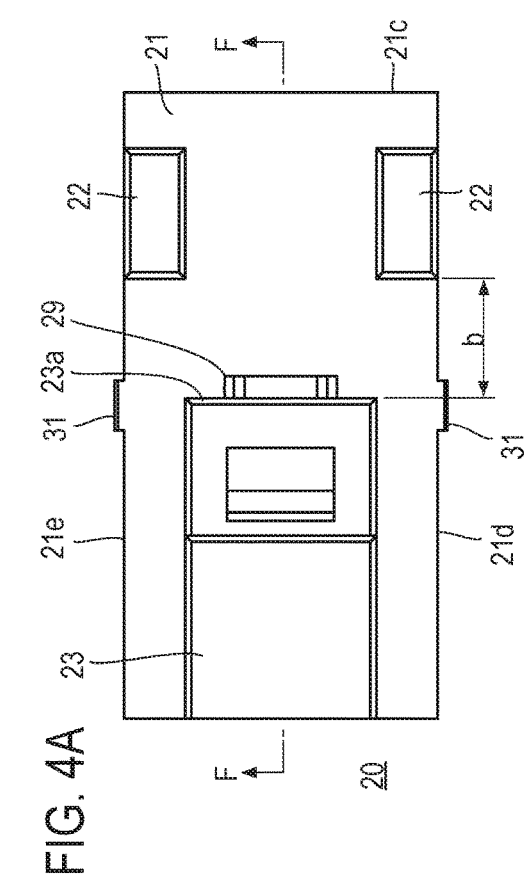
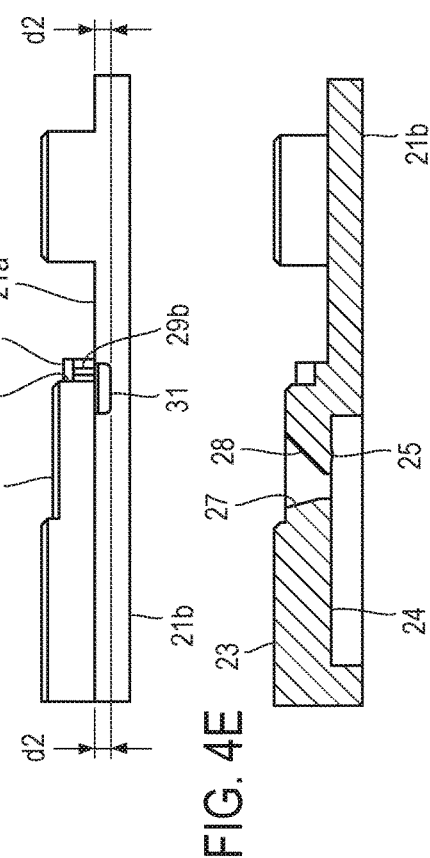
FIG. 4A  FIG. 4B  FIG. 4C  FIG. 4D  FIG. 4E

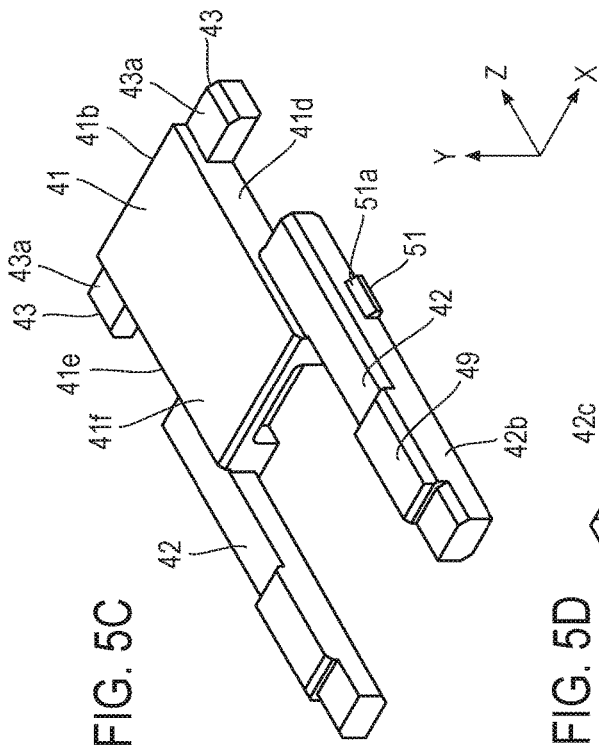
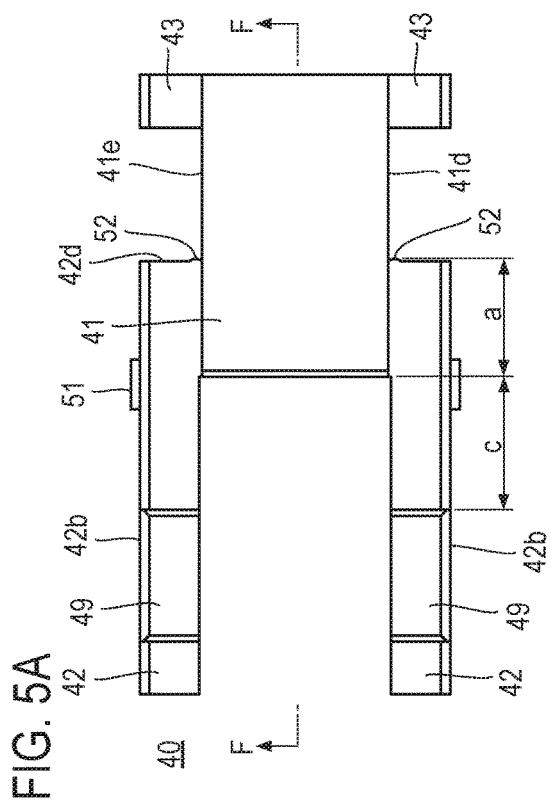
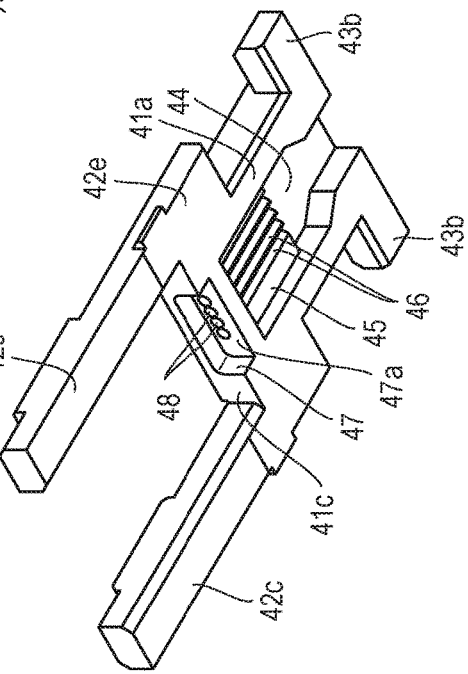
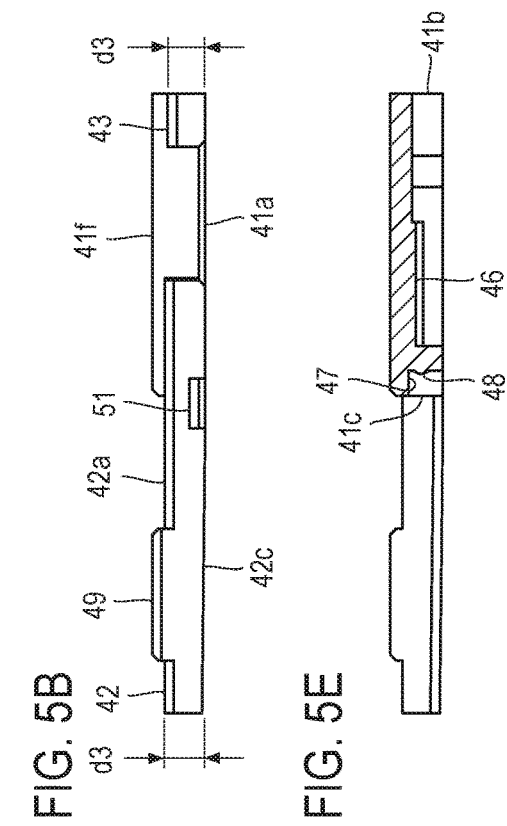
FIG. 5A  FIG. 5B  FIG. 5C  FIG. 5D  FIG. 5E

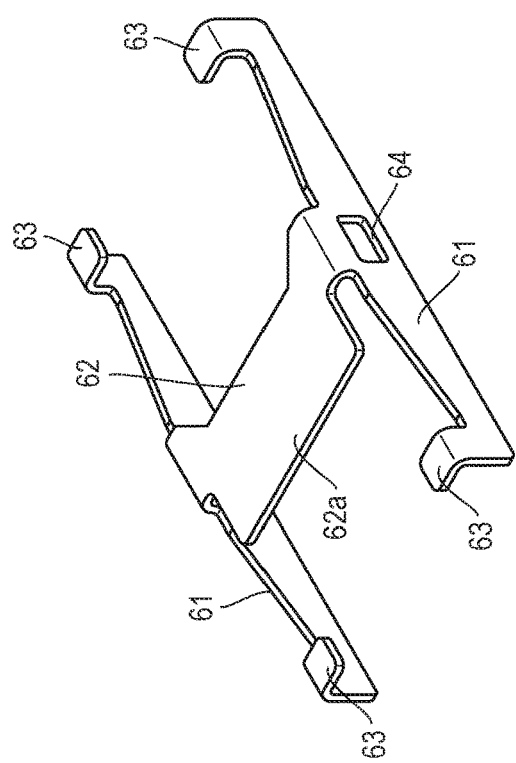
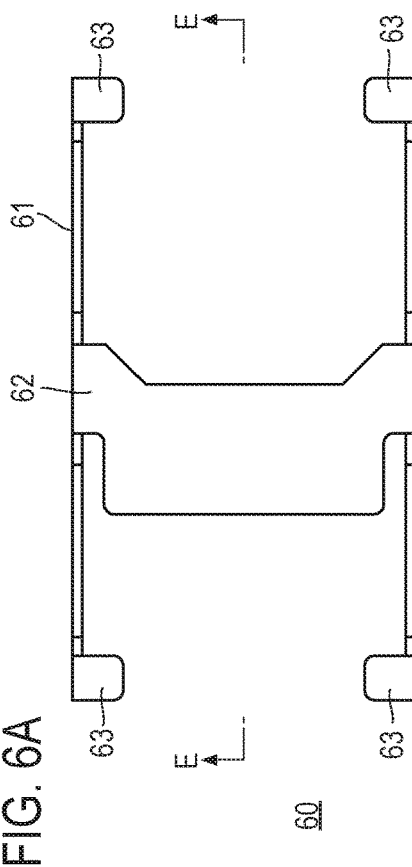
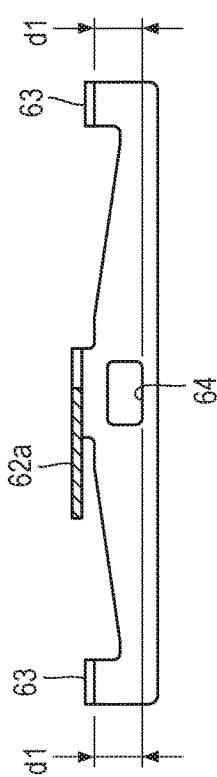

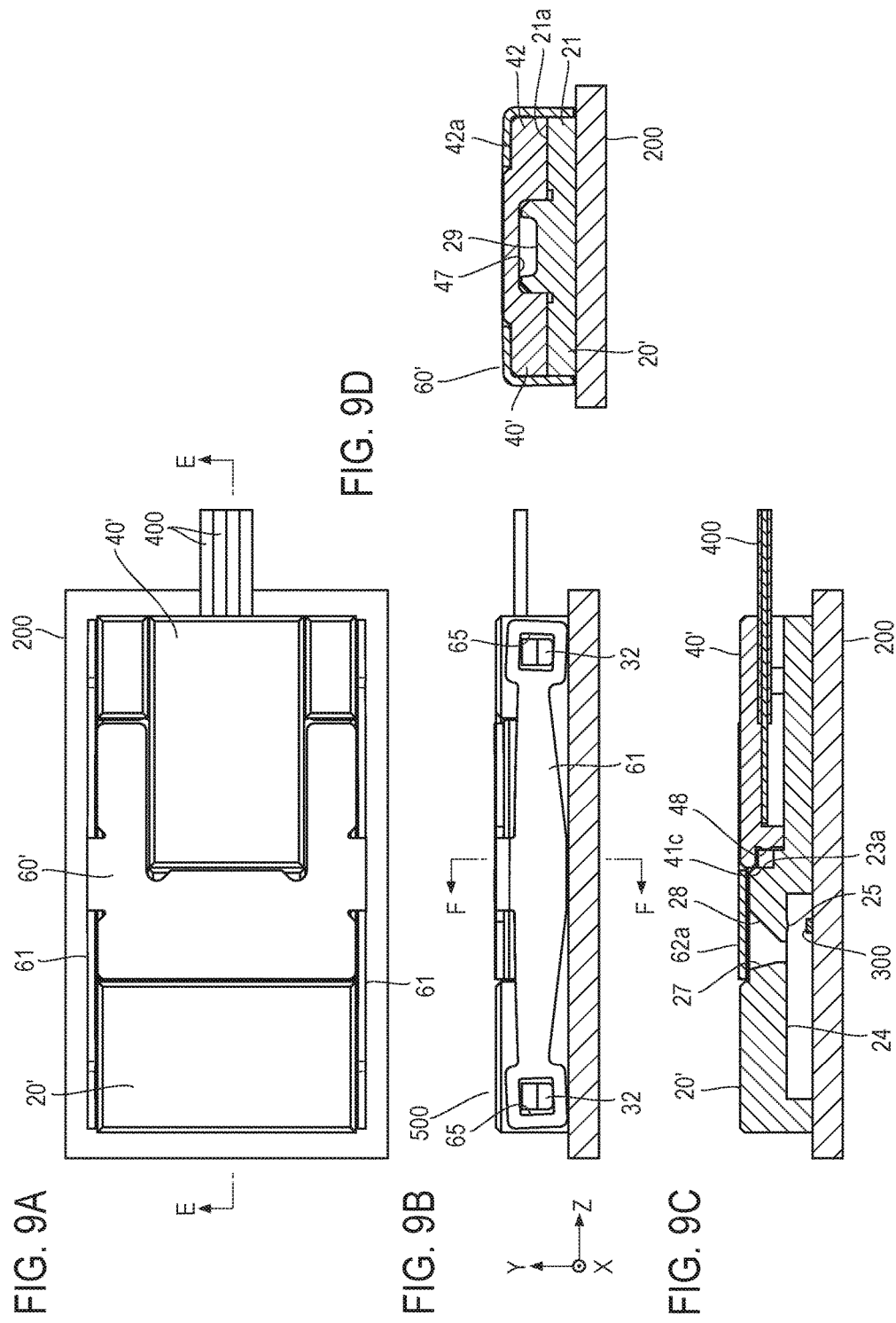

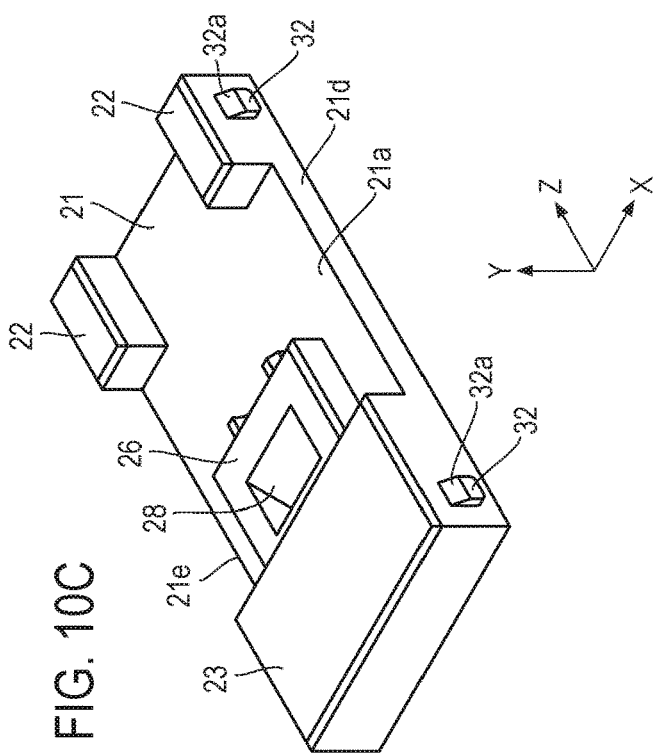
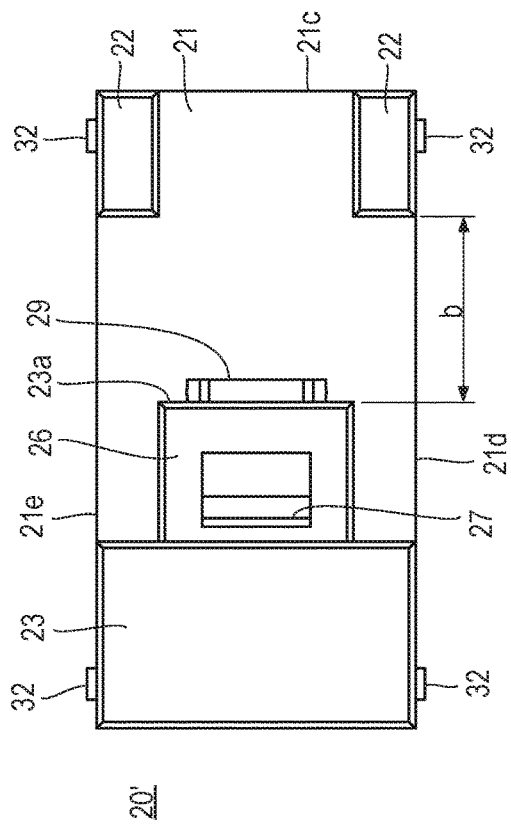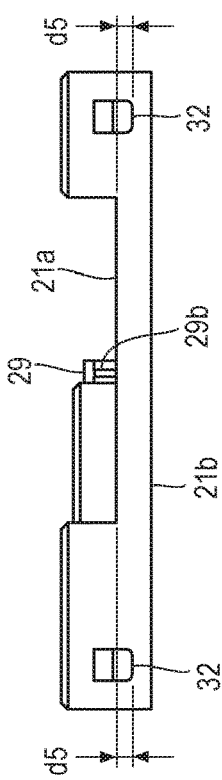
FIG. 10A
FIG. 10B
FIG. 10C

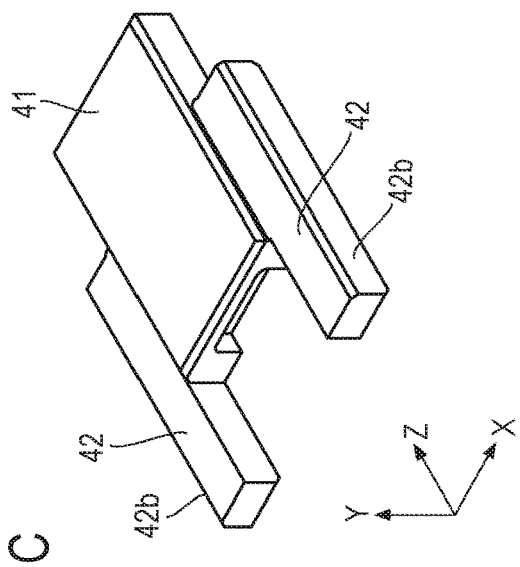
FIG. 11A
FIG. 11B
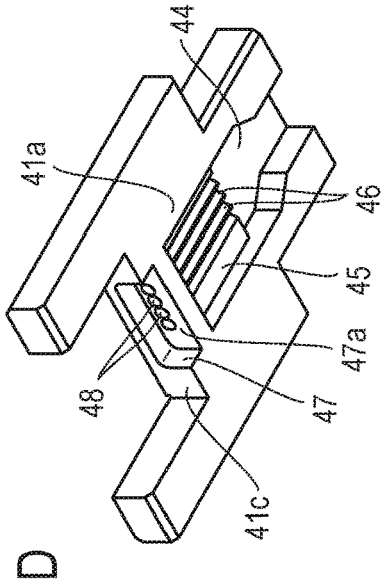
FIG. 11C
FIG. 11D
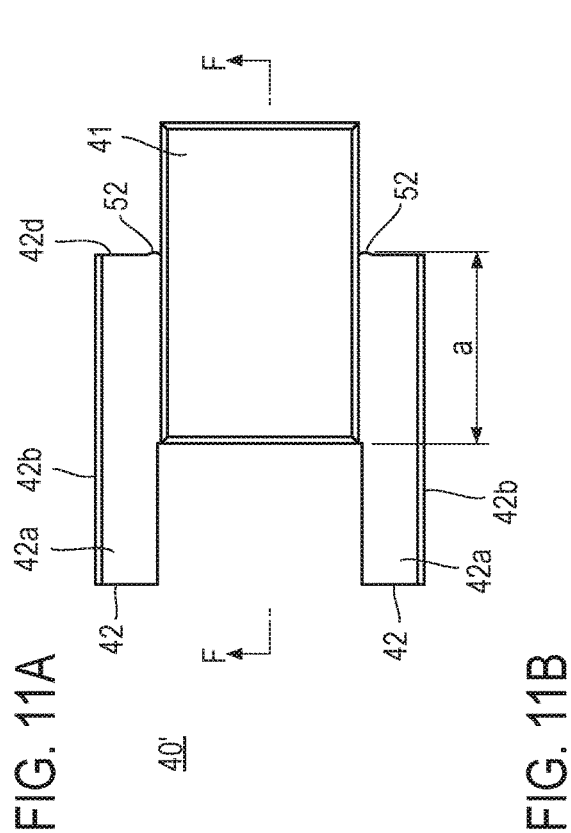
FIG. 11E

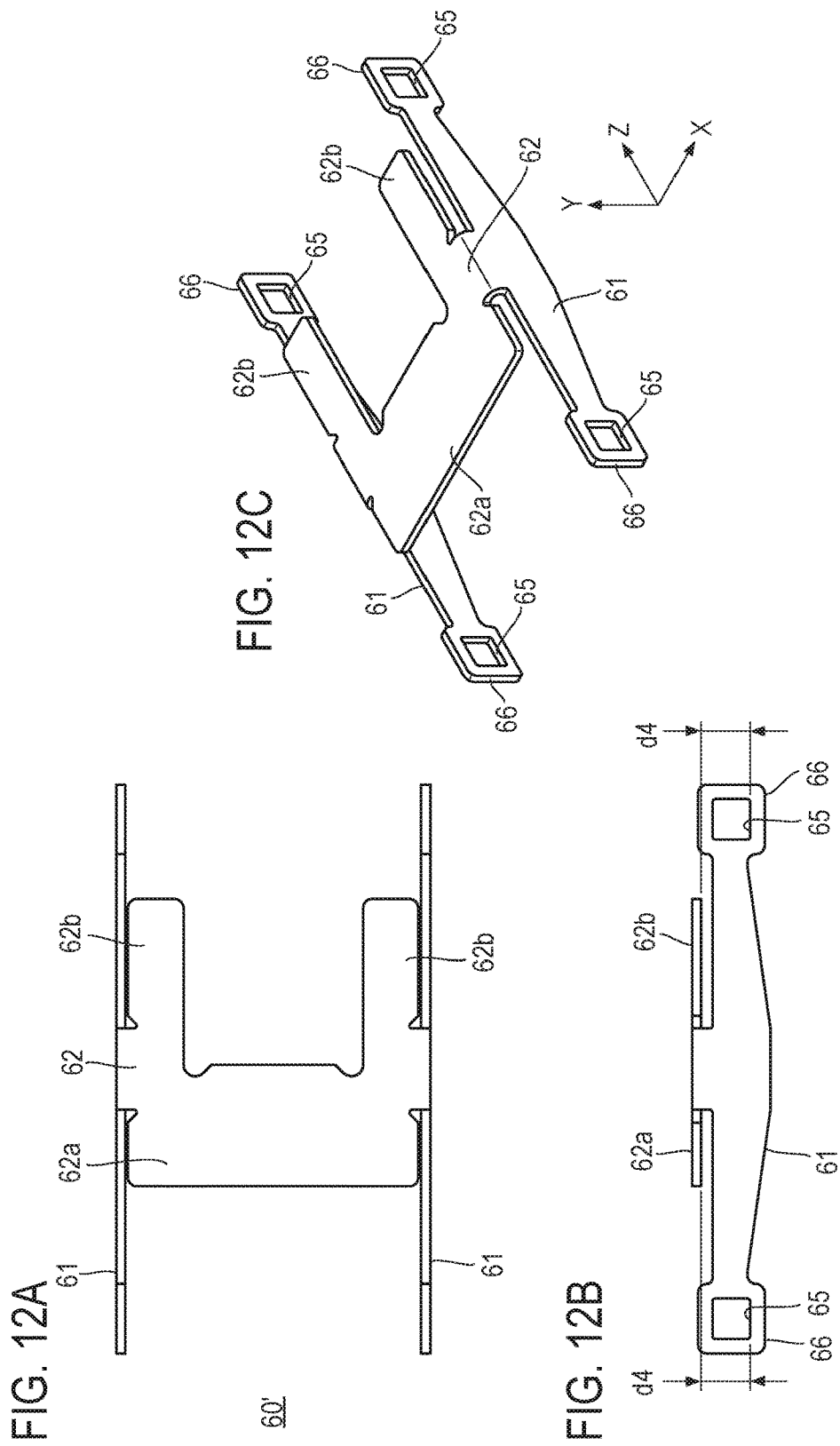

OPTICAL MODULE

TECHNICAL FIELD

The present invention relates to an optical module for optically connecting an optical fiber with an optical element or the like.

BACKGROUND ART

FIGS. 1A and 1B illustrate the configuration described in Japanese Patent Application Laid Open No. 2015-219273 as a related art example of this type of optical module. In this example, the optical module includes a first optical block 11 and a second optical block 12. The first optical block 11 is fixed on a substrate 14 on which one or more optical elements 13 are mounted. The second optical block 12 holding one or more optical fibers 15 is mounted on the first optical block 11. The number of the optical fibers 15 is generally equal to the number of the optical elements 13, and the number of the optical elements 13 is usually greater than or equal to 2.

In a state that the second optical block 12 and the first optical block 11 are interlocked, the optical elements 13 are positioned in a space 11a which is formed on a bottom surface of the first optical block 11. Lenses 11b, the number of which is equal to the number of the optical elements 13, are formed on the first optical block 11. One of the lenses 11b is positioned just above a corresponding one of the optical elements 13 in the state that the second optical block 12 and the first optical block 11 are interlocked.

The second optical block 12 includes four pieces of spring pieces 12a. The four spring pieces 12a are formed in a manner to be integrated with a main body part of the second optical block 12. A claw part 12b is formed on an end of each of the four spring pieces 12a. The second optical block 12 is pushed to the top of the first optical block 11 to fit with the first optical block 11. At this time, the claw parts 12b are hooked on an upper end of a step part 11c formed on the first optical block 11 and thus, the second optical block 12 is fixed on the first optical block 11.

A convex part 12c is formed on a bottom surface of the second optical block 12. The convex part 12c is fitted on a concave part 11d formed on an upper surface of the first optical block 11. Lenses 12d, the number of which is equal to the number of the optical elements 13, are formed on the convex part 12c. In the state that the second optical block 12 and the first optical block 11 are interlocked, an optical axis of each of the lenses 11b is accorded with an optical axis of a corresponding one of the lenses 12d. A reflection surface 12e is formed on an upper surface of the second optical block 12. The reflection surface 12e is positioned just above the lenses 12d.

The optical elements 13 are light emitting elements or light receiving elements, for example. In the case where the optical elements 13 are light emitting elements, each of the lenses 11b converts light from a corresponding one of the optical elements 13 into parallel light. Each of the lenses 12d collects the parallel light from a corresponding one of the lenses 11b. The reflection surface 12e converts travelling directions of all the light from the lenses 12d by 90°. Each of all the light from the reflection surface 12e is incident on a corresponding one of the optical fibers 15. The optical fibers 15 are held by the second optical block 12. The extending directions of the optical fibers 15 are parallel to the substrate 14.

Thus, the optical module illustrated in FIGS. 1A and 1B optically connects the optical elements 13 to the optical fibers 15. A material of the first optical block 11 is resin which transmits light. The first optical block 11 is formed by resin molding. A material of the second optical block 12 is resin which transmits light. The second optical block 12 is formed by resin molding.

Accordingly, the spring pieces 12a are formed also by resin molding. In order to easily mold the spring pieces 12a and obtain a required spring force (holding force), the width of the spring pieces 12a (that is, a dimension in a direction parallel to a plate surface of the substrate 14) has to be set large. As a result, the optical module is increased in size.

SUMMARY OF THE INVENTION

An object of the present invention is to provide an optical module smaller in size than an optical module of the related art.

An optical module according to the present invention is an optical module which optically connects an optical element with an optical fiber.

The optical module includes a first optical block, a second optical block which is assembled with the first optical block, and a metal part which is assembled with the first optical block.

The first optical block is an optical block which is to be mounted on a substrate on which the optical element is mounted.

The second optical block is an optical block having a configuration to hold the optical fiber.

The metal part includes two spring pieces which extend in an extending direction orthogonal to an assembling direction. Here, the two spring pieces are mutually connected, and the assembling direction is a direction in which the metal part is assembled with the first optical block.

In a state that the metal part is assembled with the first optical block, the second optical block is sandwiched between the first optical block and the metal part.

In the state that the metal part is assembled with the first optical block, the two spring pieces are located alongside both lateral surfaces of the first optical block.

In the state that the metal part is assembled with the first optical block, locking parts formed on the both lateral surfaces of the first optical block are hooked on the two spring pieces.

In the state that the metal part is assembled with the first optical block, the second optical block is pressed against the first optical block in the assembling direction by a spring force which is generated when the two spring pieces are hooked on the locking parts.

Effects of the Invention

According to the present invention, the spring pieces for fixing the second optical block to the first optical block are part of the metal part and are located alongside both lateral surfaces of the first optical block in the state that the metal part is assembled with the first optical block. A dimension, in a direction which is orthogonal to the assembling direction and orthogonal to the extending direction, of the optical module can be reduced by comparison to a dimension of an optical module of the related art. Accordingly, an optical module smaller in size than a related art optical module can be realized.

BRIEF DESCRIPTION OF THE DRAWINGS

FIG. 4A is a plan view of a first optical block illustrated in FIG. 2.

FIG. 4B is a front elevational view of FIG. 4A.

FIG. 4C is a right lateral view of FIG. 4A.

FIG. 4D is a perspective view of FIG. 4A.

FIG. 4E is a sectional view taken along the line F-F of FIG. 4A.

FIG. 5A is a plan view of a second optical block illustrated in FIG. 2.

FIG. 5B is a front elevational view of FIG. 5A.

FIG. 5C is a perspective view obtained when the second optical block illustrated in FIG. 2 is viewed from an obliquely upper side.

FIG. 5D is a perspective view obtained when the second optical block illustrated in FIG. 2 is viewed from an obliquely lower side.

FIG. 5E is a sectional view taken along the line F-F of FIG. 5A.

FIG. 6A is a plan view of a sheet metal part illustrated in FIG. 2.

FIG. 6B is a front elevational view of FIG. 6A.

FIG. 6C is a perspective view of FIG. 6A.

FIG. 6D is a sectional view taken along the line E-E of FIG. 6A.

FIG. 9A is a plan view of the optical module which is in the state illustrated in FIG. 8.

FIG. 9B is a front elevational view of the optical module which is in the state illustrated in FIG. 8.

FIG. 9C is a sectional view taken along the line E-E of FIG. 9A.

FIG. 9D is a sectional view taken along the line F-F of FIG. 9B.

FIG. 10A is a plan view of a first optical block illustrated in FIG. 8.

FIG. 10B is a front elevational view of the first optical block illustrated in FIG. 8.

FIG. 10C is a perspective view of the first optical block illustrated in FIG. 8.

FIG. 11A is a plan view of a second optical block illustrated in FIG. 8.

FIG. 11B is a front elevational view of the second optical block illustrated in FIG. 8.

FIG. 11C is a perspective view obtained when the second optical block illustrated in FIG. 8 is viewed from an obliquely upper side.

FIG. 11D is a perspective view obtained when the second optical block illustrated in FIG. 8 is viewed from an obliquely lower side.

FIG. 11E is a sectional view taken along the line F-F of FIG. 11A.

FIG. 12A is a plan view of a sheet metal part illustrated in FIG. 8.

FIG. 12B is a front elevational view of the sheet metal part illustrated in FIG. 8.

FIG. 12C is a perspective view of the sheet metal part illustrated in FIG. 8.

DETAILED DESCRIPTION OF THE EMBODIMENTS

Figure 1A:
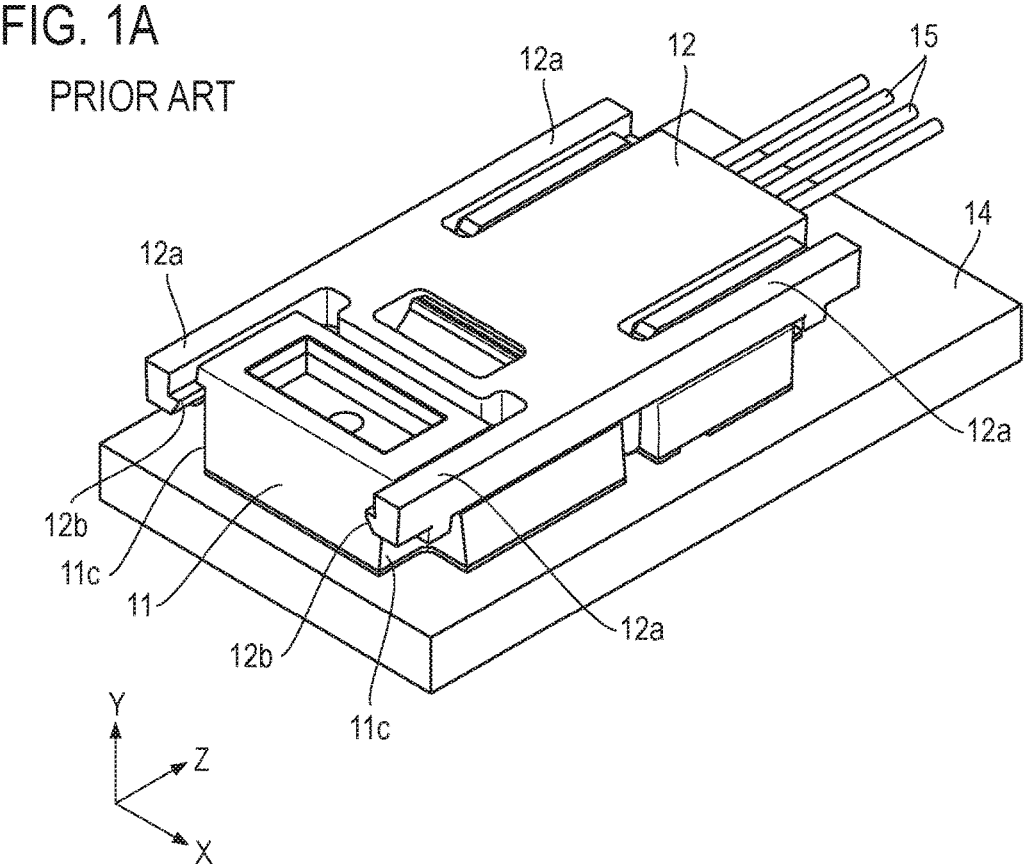
FIG. 1A is a perspective view illustrating a related art example of an optical module.

Embodiments according to the present invention will be described with reference to the accompanying drawings.

First Embodiment

FIG. 2 and FIGS. 3A to 3D illustrate a state that an optical module 100 according to the first embodiment of the present invention is mounted on a substrate 200. The optical module 100 includes a first optical block 20, a second optical block 40, and a sheet metal part 60. FIGS. 4A to 4E illustrate the detailed configuration of the first optical block 20. FIGS. 5A to 5E illustrate the detailed configuration of the second optical block 40. FIGS. 6A to 6D illustrate the detailed configuration of the sheet metal part 60. The configurations of the first optical block 20, the second optical block 40, and the sheet metal part 60 will be described with reference to FIGS. 4A to 4E, 5A to 5E, and 6A to 6D.

As illustrated in FIGS. 4A to 4E, the first optical block 20 includes a base part 21 having a rectangular plate shape. On an upper surface of the base part 21, two pieces of protruding parts 22 are formed. A pedestal shaped part 23 which is larger than the protruding part 22 is formed. In the following description, a short side direction of the base part 21 is set as the X direction, a long side direction of the base part 21 is set as the Z direction, and a direction, which is orthogonal to an upper surface 21a of the base part 21, is set as the Y direction. The X direction and the Z direction are parallel to a plate surface of the substrate 200 illustrated in FIG. 2 and FIGS. 3A to 3D. The Y direction is orthogonal to the plate surface of the substrate 200.

A shape of the pedestal shaped part 23 viewed from the Y direction is rectangular. The pedestal shaped part 23 is formed on one side, in the Z direction, of the base part 21. The width (that is, the length in the X direction) of the pedestal shaped part 23 is smaller than the width (that is, the length of the short side) of the base part 21. On both sides, in the X direction, of the pedestal shaped part 23, parts of the upper surface 21a the base part 21 are positioned.

On a lower surface 21b of the base part 21, a space 24 for accommodating one or more optical elements 300 is formed. The space 24 is positioned on the downside of the pedestal shaped part 23 (see FIG. 4E). On a top surface of the space 24, lenses 25 for light converging are formed. The total number of the lenses 25 is four in this example. The four pieces of lenses 25 are aligned in the X direction on the position illustrated in FIG. 4E. A step part 26 is joined to the pedestal shaped part 23. The upper surface of the step part 26 is a little lower than the upper surface of the pedestal shaped part 23. An opening 27 communicating with the space 24 is formed in the step part 26. On an inner surface of the opening 27, a reflection surface 28 is formed. The reflection surface 28 is positioned just above the lenses 25 (see FIG. 4E).

As illustrated in FIG. 4C, a convex part 29 is joined to a lateral surface 23a of the pedestal shaped part 23. The lateral surface 23a is a surface facing toward the center of the base part 21. A shape of the convex part 29 viewed from the Z direction is a staple shape. The convex part 29 is joined to the lateral surface 23a in a manner that ends of the staple face the +Y direction. Inclined surfaces 29a are formed on upper ends, in the X direction, on both outer lateral surfaces of the convex part 29. Protrusions 29b each having a rib shape are formed on the rest of the outer lateral surfaces of the convex part 29. The protrusions 29b extend in the Y direction.

Two pieces of protruding parts 22 are formed on the other side, in the Z direction, of the base part 21 (that is, the side opposite to the side on which the pedestal shaped part 23 is positioned). Each of the two pieces of protruding parts 22 has a rectangular shape when viewed from the Y direction. The two pieces of protruding parts 22 are positioned on a little more inner side, in the Z direction, than an end surface 21c of the base part 21. The two pieces of protruding parts 22 are formed along lateral surfaces 21d and 21e perpendicular to the X direction, of the base part 21. A part of the upper surface 21a of the base part 21 is positioned between the two pieces of protruding parts 22. The width (the length in the X direction) of a part, which is positioned between the step part 26 and the two pieces of protruding parts 22 in the Z direction, of the upper surface 21a is same as the width of the base part 21. A protruding part 31 protrudes outward at the central part, in the Z direction, on the lateral surface 21d of the base part 21. In the same manner, another protruding part 31 protrudes outward at the central part, in the Z direction, on the lateral surface 21e of the base part 21. The protruding part 31 is a locking part.

A material of the first optical block 20 having the above-mentioned configuration is resin which transmits light. The first optical block 20 is formed by resin molding.

As illustrated in FIGS. 5A to 5E, the second optical block 40 includes a holding part 41 having a substantially rectangular parallelepiped shape, two pieces of extending parts 42, and two pieces of protruding parts 43. A concave part 44 is formed on a lower surface 41a of the holding part 41. The concave part 44 extends from an end surface 41b to the vicinity of an end surface 41c. The end surface 41b is one lateral surface, in the Z direction, of the holding part 41 and the end surface 41c is the other lateral surface, in the Z direction, of the holding part 41. A step part 45 is formed on an inner end side of the concave part 44. The step part 45 is a little higher than a bottom surface of the concave part 44.

V grooves 46 are formed on the step part 45. The V grooves 46 extend in the Z direction. The total number of the V grooves 46 is four in this example. The width (the length in the X direction) of the concave part 44 on the end surface 41b is smaller than the width of the concave part 44 on the end surface 41c.

A concave part 47 is formed on a corner part between the end surface 41c and the lower surface 41a of the holding part 41. Four pieces of lenses 48 are formed on a bottom surface 47a, which is parallel to the end surface 41c, of the concave part 47. The four pieces of lenses 48 are positioned on the extension of the four pieces of V grooves 46.

One of the two pieces of extending parts 42 extends from and along a lateral surface 41d in the Z direction. In a similar manner, the other of the two pieces of extending parts 42 extends from and along a lateral surface 41e in the Z direction. The lateral surfaces 41d and 41e are lateral surfaces of the holding part 41 which are perpendicular to the X direction. Each base end of the two pieces of extending parts 42 is positioned in the vicinity of the end surface 41c of the holding part 41. Peripheral ends of the two pieces of extending parts 42 largely protrude from the end surface 41c. A step part 49 is formed on each upper surface 42a of the two pieces of extending parts 42. Each of the step parts 49 is formed in the vicinity of a corresponding one of the peripheral ends of the extending parts 42. Each of the step part 49 is a little higher than the upper surface 42a. A protruding part 51 protrudes outward from each outer lateral surface 42b of the two pieces of extending parts 42. A lateral surface, which faces upward in the Y direction, of the protruding part 51 is an inclined surface 51a. The protruding parts 51 are positioned on the center in the whole length (the length in the Z direction) of the second optical block 40. With respect to each of the extending parts 42, a lower surface, which is closer to the peripheral end than a part on which the protruding part 51 is positioned, of the extending part 42 is an inclined surface 42c. The inclined surface 42c is slightly inclined. Accordingly, with respect to each of the extending parts 42, the peripheral end of the extending part 42 is positioned higher, in the Y direction, than the part, on which the protruding part 51 is positioned, of the extending part 42. A protrusion 52 having a rib shape is formed on each end surface 42d of the two pieces of extending parts 42, the end surface 42d being on the base end side. The protrusions 52 extend in the Y direction.

One of the two pieces of protruding parts 43 protrudes outward (the +X direction) from the lateral surface 41d of the holding part 41. In a similar manner, the other of the two pieces of protruding parts 43 protrudes outward (the −X direction) from the lateral surface 41e of the holding part 41. The two pieces of protruding parts 43 are positioned on parts close to the end surface 41b. The upper surfaces 42a of the extending parts 42 and upper surfaces 43a of the protruding parts 43 are lower than an upper surface 41f of the holding part 41. The upper surfaces 42a and the upper surfaces 43a are positioned lower than the upper surface 41f in the Y direction. Lower surfaces 42e of the extending parts 42, lower surfaces 43b of the protruding parts 43, and the lower surface 41a of the holding part 41 are positioned on the same plane. The lower surfaces 42e are lower surfaces which are positioned closer to the base ends than the inclined surfaces 42c.

As is the case with the first optical block 20, a material of the second optical block 40 is resin which transmits light. The second optical block 40 is formed by resin molding.

The sheet metal part 60 is formed of an elastic metal plate. As illustrated in FIGS. 6A to 6D, the sheet metal part 60 includes two pieces of spring pieces 61 and a connecting part 62. The two pieces of spring pieces 61 extend in parallel to the Z direction. The plate thickness direction of the spring piece 61 is the X direction and the width direction of the spring piece 61 is the Y direction. A hold-down part 63 is formed on each of both end parts, in the Z direction, of one spring piece 61. In the same manner, a hold-down part 63 is formed on each of both end parts, in the Z direction, of the other spring piece 61. Each of the hold-down parts 63 slightly extends from the spring piece 61 in the Y direction and further, is bent inward. A window 64 is formed on each central part, in the Z direction, of the two pieces of spring pieces 61.

The connecting part 62 connects the central part, in the Z direction, of one spring piece 61 and the central part, in the Z direction, of the other spring piece 61. The connecting part 62 is joined to a plate part 62a which is orthogonal to the Y direction. The plate part 62a has a shape which extends from the connecting part 62 to one side in the Z direction. With respect to each of the spring pieces 61, the width (the length in the Y direction) of the spring piece 61 becomes gradually smaller from the central part on which the window 64 is formed toward the end part on which the hold-down part 63 is formed.

Figure 7:
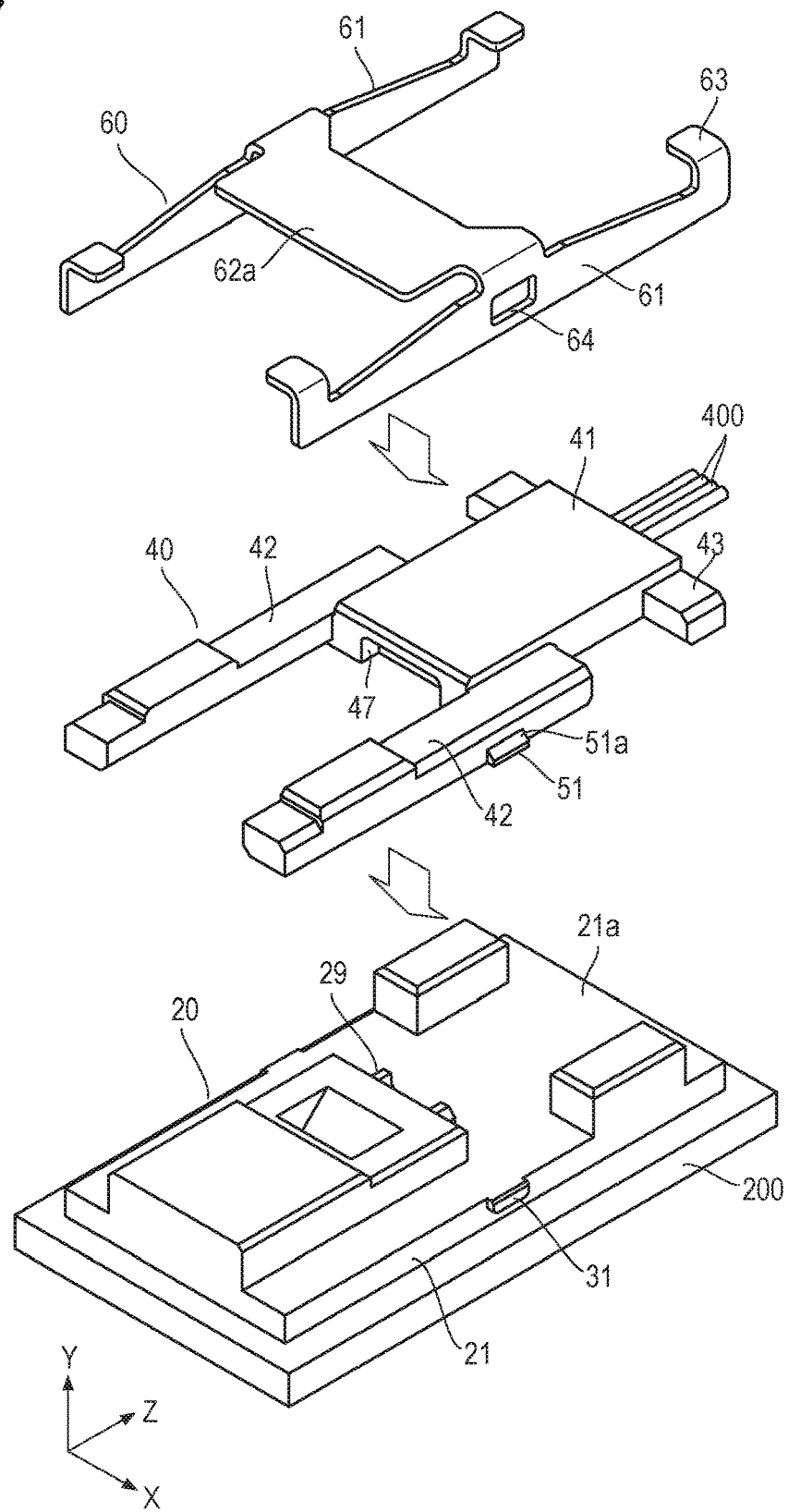
FIG. 7 illustrates assembly of the optical module illustrated in FIG. 2.
Figure 8:
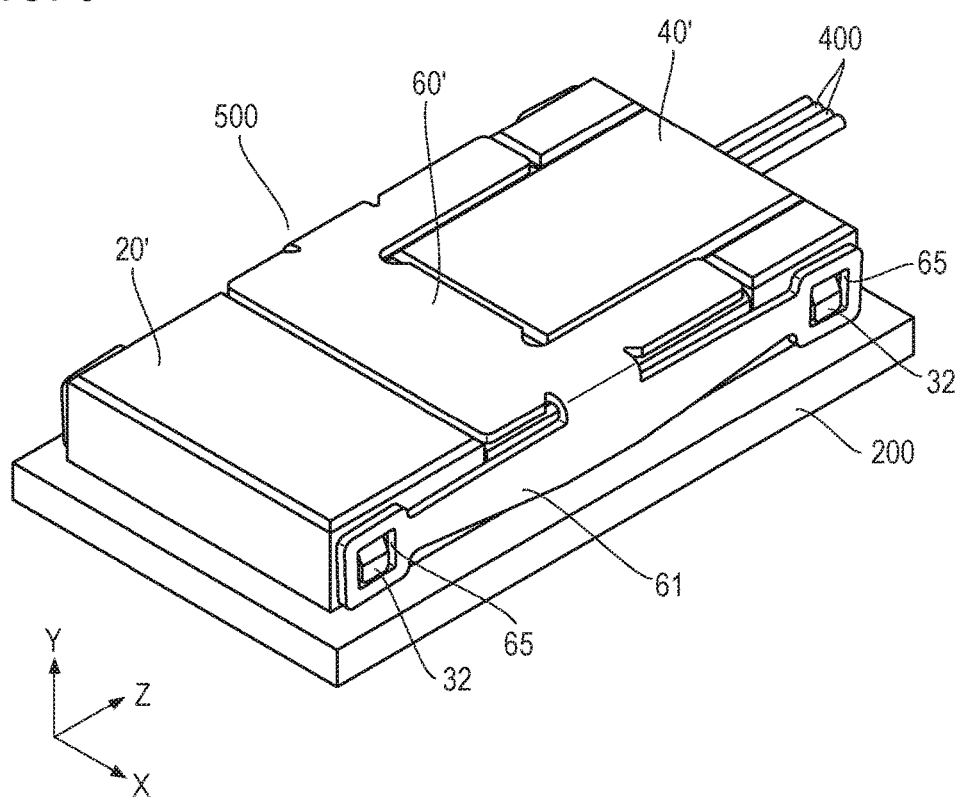
FIG. 8 is a perspective view illustrating a state that an optical module according to a second embodiment of the present invention is mounted on a substrate.

FIG. 7 illustrates assembly of the optical module 100 on the substrate 200.

Figure 3A:
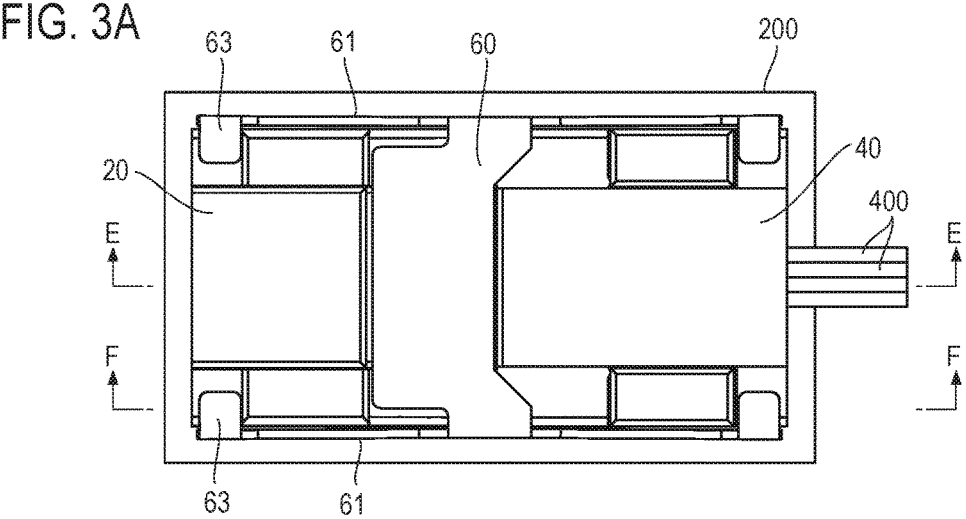
FIG. 3A is a plan view of the optical module which is in the state illustrated in FIG. 2.
Figure 3B:
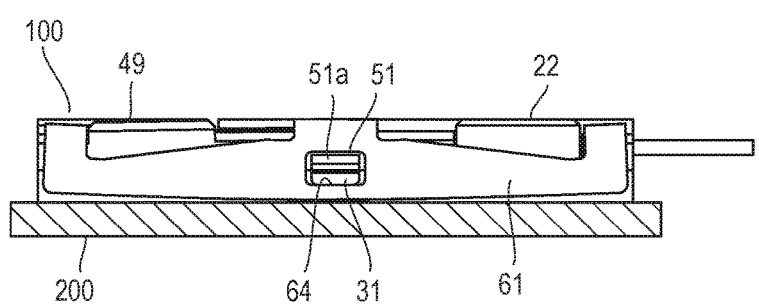
FIG. 3B is a front elevational view of FIG. 3A.
Figure 3C:
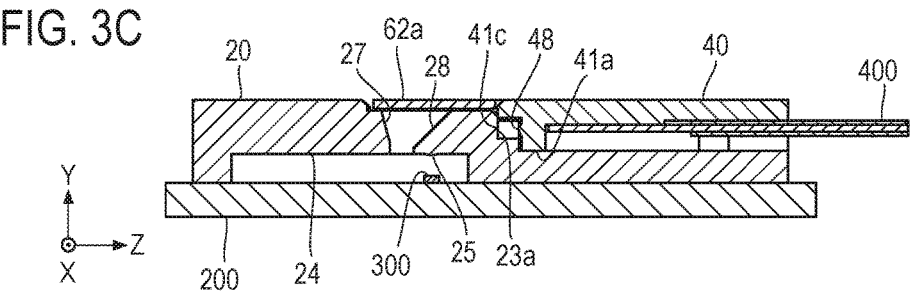
FIG. 3C is a sectional view taken along the line E-E of FIG. 3A.
Figure 3D:
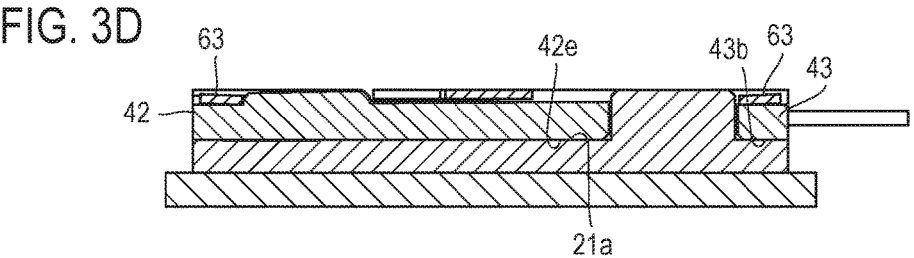
FIG. 3D is a sectional view taken along the line F-F of FIG. 3A.

The first optical block 20 is fixed on the substrate 200 with an adhesive, for example. As illustrated in FIG. 3C, the optical elements 300 are mounted on the substrate 200. In the state that the first optical block 20 is fixed on the substrate 200, the lenses 25 are positioned just above the optical elements 300 and each of the optical axes of the optical elements 300 is accorded with a corresponding one of the optical axes of the lenses 25. In the state that the first optical block 20 is fixed on the substrate 200, the optical elements 300 are accommodated in the space 24 of the first optical block 20.

Optical fibers 400 are fixed in the four pieces of V grooves 46 of the second optical block 40. The second optical block 40 holding the optical fibers 400 is attached to the first optical block 20 from above in the Y direction. The second optical block 40 is fitted in the first optical block 20. In the state that the second optical block 40 is attached to the first optical block 20, the holding part 41, the two pieces of extending parts 42, and the two pieces of protruding parts 43 are in contact with the upper surface 21a of the base part 21 of the first optical block 20. When the second optical block 40 is fitted in the first optical block 20, the convex part 29 of the first optical block 20 is pressed in the concave part 47 of the second optical block 40. The convex part 29 on which the protrusions 29b are formed is pushed in the concave part 47, determining a position, in the X direction, of the second optical block 40 with respect to the first optical block 20.

A part, which is denoted by a symbol "a" in FIG. 5A, of the second optical block 40 is pressed into a part, which is denoted by a symbol "b" in FIG. 4A, of the first optical block 20. The part a on which the protrusions 52 are formed is pushed in the part b and thus, the end surface 41c of the holding part 41 of the second optical block 40 is pressed against the lateral surface 23a of the pedestal shaped part 23 of the first optical block 20. Thus, the position, in the Z direction, of the second optical block 40 with respect to the first optical block 20 is determined.

The sheet metal part 60 is attached to the first optical block 20, on which the second optical block 40 is attached, from above in the Y direction (see FIG. 2 and FIGS. 3A to 3D).

In the state that the sheet metal part 60 is attached to the first optical block 20, the plate part 62a is positioned on a part, which is denoted by a symbol "c" in FIG. 5A, of the second optical block 40. In the state that the sheet metal part 60 is attached to the first optical block 20, the four pieces of hold-down parts 63 are positioned on peripheral ends of the two pieces of extending parts 42 and on the two pieces of protruding parts 43 of the second optical block 40. In the state that the sheet metal part 60 is attached to the first optical block 20, the two pieces of windows 64 formed on the spring pieces 61 are hooked on the protruding parts 31 of the first optical block 20. In the state that the second optical block 40 is attached to the first optical block 20, the protruding parts 51 of the second optical block 40 are overlapped directly above the protruding parts 31 of the first optical block 20. Since the inclined surfaces 51a are formed on the protruding parts 51, the spring pieces 61 can be easily hooked on the protruding parts 31.

By attaching the sheet metal part 60 to the first optical block 20, the second optical block 40 is sandwiched between the first optical block 20 and the sheet metal part 60. The second optical block 40 is pressed against the first optical block 20 in the Y direction by the spring force of the spring pieces 61. Thus, the position, in the Y direction, of the second optical block 40 with respect to the first optical block 20 is determined. The dimension d1, in the Y direction, from the lower surface of the hold-down part 63 to the bottom of the window 64 (see FIG. 6D) is smaller by a predetermined amount than a sum of the dimension d2 from the upper surface 21a of the base part 21 to the lower surface of the protruding part 31 (see FIG. 4B) and the dimension (thickness) d3, in the Y direction, of the peripheral end of the extending part 42 or of the protruding part 43 (see FIG. 5B). Accordingly, in the state that the sheet metal part 60 is attached to the first optical block 20, the lower surface 41a of the holding part 41 of the second optical block 40 is pressed against the upper surface 21a of the base part 21 of the first optical block 20.

The pedestal shaped part 23 of the first optical block 20 and the holding part 41 of the second optical block 40 are assembled with high accuracy and the second optical block 40 is positioned with respect to the first optical block 20 as mentioned above. Accordingly, the optical elements 300 mounted on the substrate 200 are optically connected to the optical fibers 400 held by the second optical block 40 with high optical coupling efficiency (that is, with low loss). The optical element 300 is a light emitting element such as a vertical cavity surface emitting laser (VCSEL) or a light receiving element such as a photo diode (PD). In this example, maximum four pieces of optical elements 300 are optically connected to the optical fibers 400.

In the case where the optical elements 300 are VCSELs, for example, each of the lenses 25 converts light emitted from a corresponding one of the optical elements 300 into parallel light. The reflection surface 28 having inclination of 45° with respect to the plate surface of the substrate 200 converts the traveling directions of all the parallel light from the lenses 25 by 90°. All the light from the reflection surface 28 are emitted from the lateral surface 23a of the pedestal shaped part 23. All the parallel light emitted from the lateral surface 23a travel through a space to reach the lenses 48 of the holding part 41. Each of all the parallel light is collected by a corresponding one of the lenses 48 to be incident on the end surface of a corresponding one of the optical fibers 400. Thus, the optical elements 300 and the optical fibers 400 are optically connected with each other via the lenses 25 and 48 and the reflection surface 28, in this example. The incidence and emission directions of light between the pedestal shaped part 23 of the first optical block 20 and the holding part 41 of the second optical block 40 are parallel to the Z direction which is parallel to the plate surface of the substrate 200.

The configuration of the optical module according to the first embodiment of the present invention has been described above. According to the optical module 100 of the first embodiment, the following advantageous effects are obtained.

Figure 1B:
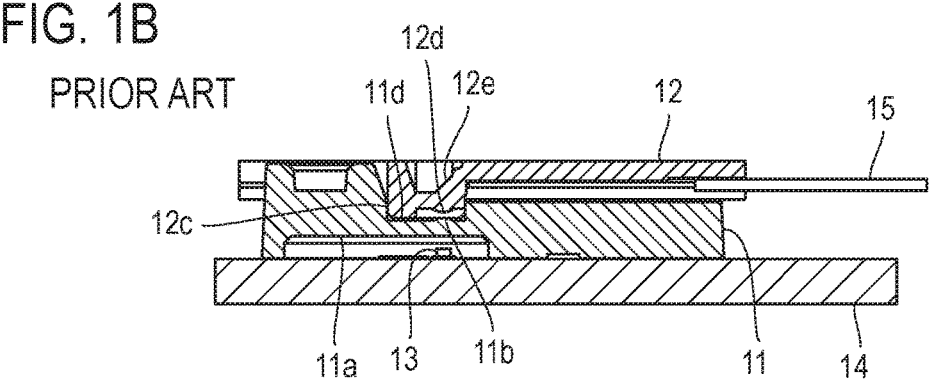
FIG. 1B is a sectional view of FIG. 1A.
Figure 2:
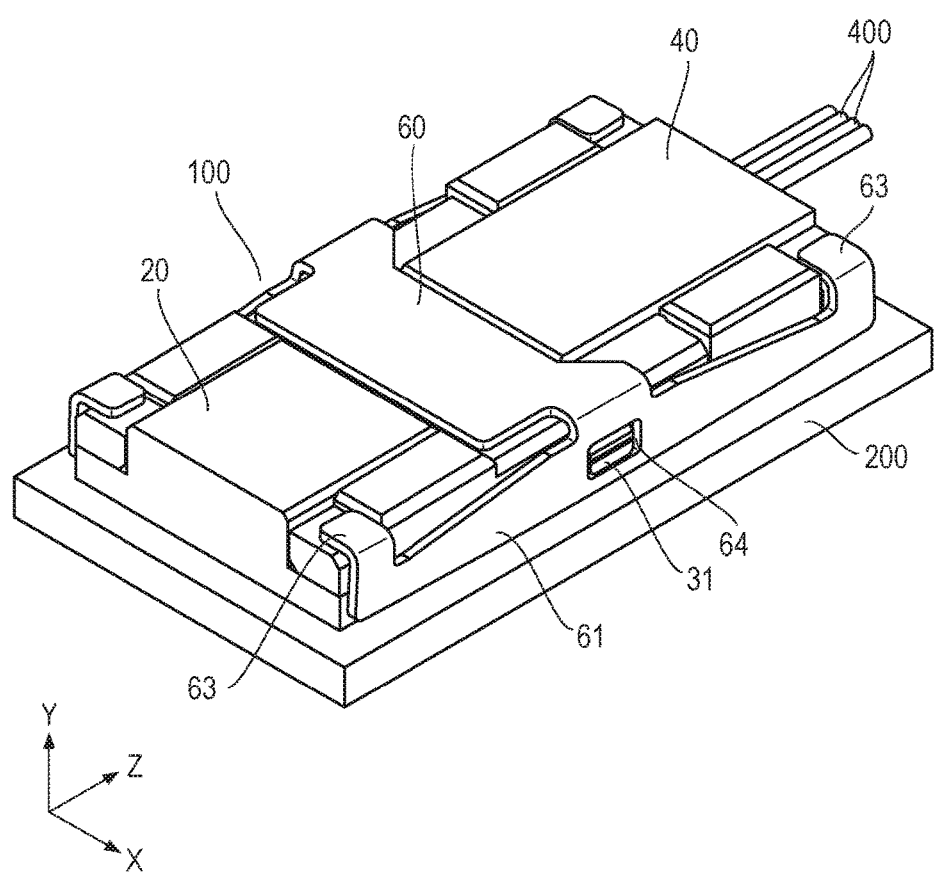
FIG. 2 is a perspective view illustrating a state that an optical module according to a first embodiment of the present invention is mounted on a substrate.

(1) The spring pieces 61 generate a force for pressing the second optical block 40 against the first optical block 20. The spring piece 61 is made of sheet metal. The plate thickness direction of the spring piece 61 is parallel to the plate surface of the substrate 200. The two spring pieces 61 are along the both lateral surfaces 21d and 21e of the base part 21 of the first optical block 20. A dimension (region) occupied by the spring pieces 61 in the X direction which is parallel to the plate surface of the substrate 200 is largely reduced by comparison to the optical module having the spring pieces, which are made of resin, of the related art illustrated in FIGS. 1A and 1B. Thus, a small-sized optical module can be realized.

(2) The width direction of the spring piece 61 is orthogonal to the plate surface of the substrate 200. The width direction of the spring piece 61 is the load direction. Accordingly, a sufficient pressing force can be obtained.

(3) The optical module 100 can be assembled by sequentially fitting the second optical block 40 and the sheet metal part 60 to the first optical block 20 from above in a direction orthogonal to the plate surface of the substrate 200 (the Y direction). Thus, the optical module 100 can be easily assembled.

(4) The second optical block 40 is pressed against the first optical block 20 in the Y direction. Accordingly, high positioning accuracy can be obtained in the Y direction (an assembling direction) as well. The optical connection direction of the first optical block 20 and the second optical block 40 is the Z direction which is parallel to the plate surface of the substrate 200. Thus, an optical module having low height can be realized.

(5) The inclined surfaces 51a (chamfered surfaces) are formed on the protruding parts 51 of the second optical block 40 which are overlapped with the protruding parts 31. Accordingly, the spring pieces 61 can be easily hooked on the protruding parts 31 of the first optical block 20. Inclined surfaces do not have to be formed on the protruding parts 31. Accordingly, the strength of locking parts (protruding parts 31) on which the spring pieces 61 are hooked can be enhanced. However, in the case where the strength of the protruding parts 31 on which inclined surfaces are formed can be secured, for example, the protruding parts 51 of the second optical block 40 do not have to be formed.

(6) The lower surfaces of the two pieces of extending parts 42 of the second optical block 40 are the inclined surfaces 42c. Even if the extending parts 42 are warped when the second optical block 40 is molded, any influence of the warp of the extending parts 42 is not exerted when the second optical block 40 is pressed against the first optical block 20.

(7) The plate part 62a of the sheet metal part 60 blocks the opening 27 of the first optical block 20, as illustrated in FIG. 3C. Accordingly, entry of foreign matter to the space 24, in which the optical elements 300 are disposed, can be prevented.

Second Embodiment

FIG. 8 and FIGS. 9A to 9D illustrate a state that an optical module 500 according to the second embodiment of the present invention is mounted on the substrate 200. The optical module 500 according to the second embodiment includes a first optical block 20', a second optical block 40', and a sheet metal part 60'. FIGS. 10A to 10C illustrate the detailed configuration of the first optical block 20'. FIGS. 11A to 11E illustrate the detailed configuration of the second optical block 40'. FIGS. 12A to 12C illustrate the detailed configuration of the sheet metal part 60'. The configurations of the first optical block 20', the second optical block 40', and the sheet metal part 60' will be described with reference to FIGS. 10A to 10C, 11A to 11E, and 12A to 12C. Components corresponding to those in the first embodiment will be denoted by the same reference characters and duplicate description thereof will be omitted.

In the first optical block 20', the width, in the X direction, of the pedestal shaped part 23 (the width of the pedestal shaped part 23 on the outer end side, in the Z direction, on which the step part 26 is not formed) is equal to the width, in the X direction, of the base part 21. The two pieces of protruding parts 22 are arranged along the end surface 21c, in the Z direction, of the base part 21. In the second embodiment, the protruding parts 31 are not provided on the central parts, in the Z direction, of the both lateral surfaces 21d and 21e of the base part 21. In the second embodiment, protruding parts 32 are formed on both end parts, in the Z direction, of the lateral surface 21d of the base part 21. In the same manner, protruding parts 32 are formed on both end parts, in the Z direction, of the lateral surface 21e of the base part 21. In other words, the protruding parts 32 are formed on respective lateral surfaces of the pedestal shaped part 23 and respective lateral surfaces of the protruding parts 22. A lateral surface, which faces upward in the Y direction, of the protruding part 32 is an inclined surface 32a.

Here, not illustrated in FIGS. 10A to 10C, the first optical block 20' includes the space 24 and the lenses 25 (see FIG. 9C) as is the case with the first optical block 20 of the first embodiment.

The second optical block 40' does not include the two pieces of protruding parts 43. Compared to the first embodiment, the length of two pieces of extending parts 42 (the length from the end surface 41c of the holding part 41) is shorter. The step parts 49 are not provided on the upper surfaces 42a of the two pieces of extending parts 42. The protruding parts 51 are not provided on the outer lateral surfaces 42b of the two pieces of extending parts 42.

The sheet metal part 60' includes the two pieces of spring pieces 61 and the connecting part 62 as is the case with the sheet metal part 60 of the first embodiment. Neither the hold-down parts 63 nor the windows 64 are provided on the two pieces of spring pieces 61. In the second embodiment, windows 65 are formed on both ends, in the Z direction, of each of the two pieces of spring pieces 61 (four places in total). Wide parts 66 having a little wider width are formed on both ends of the spring piece 61. Each of the windows 65 is formed in a corresponding one of the wide parts 66.

The plate part 62a which extends in one side in the Z direction and two pieces of plate parts 62b are formed on the connecting part 62. Each of the two pieces of plate parts 62b extends from the connecting part 62 to the other side in the Z direction. A shape of a combination of the plate part 62a and the two pieces of plate parts 62b is a staple shape when viewed from the Y direction. Ends of the staple face the +Z direction.

Figure 13:
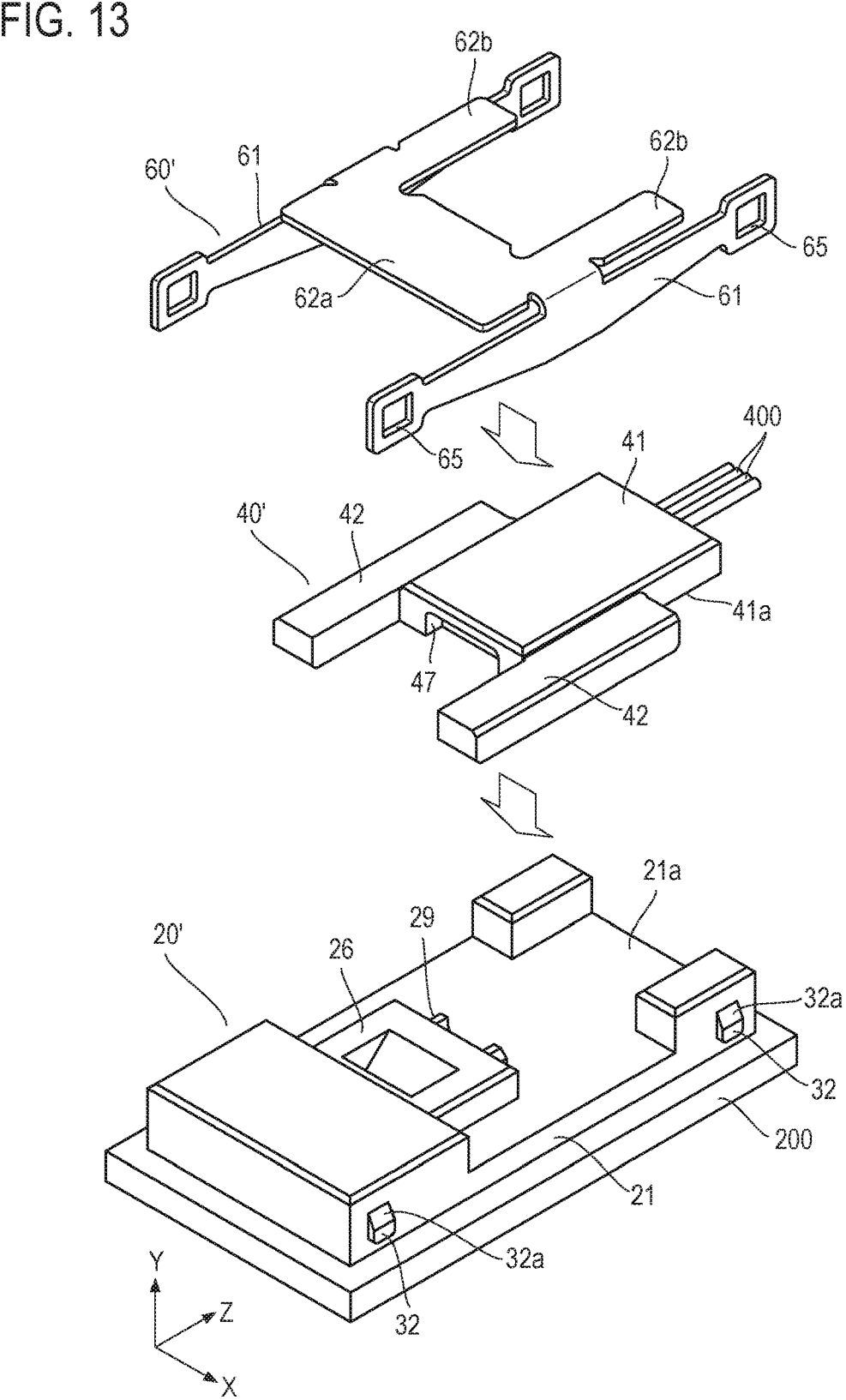
FIG. 13 illustrates assembly of the optical module illustrated in FIG. 8.

FIG. 13 illustrates assembly of the optical module 500 on the substrate 200 according to the second embodiment.

The first optical block 20' is fixed on the substrate 200, on which the optical elements 300 are mounted, with an adhesive, for example. The second optical block 40' on which the optical fibers 400 are mounted is attached to the first optical block 20' from above in the Y direction. In the state that the second optical block 40' is attached to the first optical block 20', the holding part 41 and the two pieces of extending parts 42 are positioned on the upper surface 21a of the base part 21 of the first optical block 20'. When the second optical block 40' is attached to the first optical block 20', the convex part 29 on which the protrusions 29b are formed is pressed into the concave part 47. Thus, the position, in the X direction, of the second optical block 40' with respect to the first optical block 20' is determined.

A part, which is denoted by a symbol "a" in FIG. 11A, of the second optical block 40' is pressed into a part, which is denoted by a symbol "b" in FIG. 10A, of the first optical block 20'. The part a on which the protrusions 52 are formed is pushed in the part b and thus, the end surface 41c of the holding part 41 of the second optical block 40' is pressed against the lateral surface 23a of the pedestal shaped part 23 of the first optical block 20'. Thus, the position, in the Z direction, of the second optical block 40' with respect to the first optical block 20' is determined.

The sheet metal part 60' is attached to the first optical block 20', on which the second optical block 40' is attached, from above in the Y direction (see FIG. 8 and FIGS. 9A to 9D).

In the state that the sheet metal part 60' is attached to the first optical block 20', the windows 65 of the spring pieces 61 are hooked on the protruding parts 32 of the first optical block 20'. In the state that the sheet metal part 60' is attached to the first optical block 20', the combination of the plate part 62a and the two pieces of plate parts 62b is positioned on the step part 26 of the first optical block 20' and the two pieces of extending parts 42 of the second optical block 40'. Since the inclined surfaces 32a are formed on the protruding parts 32, the spring pieces 61 can be easily hooked on the protruding parts 32.

By attaching the sheet metal part 60' to the first optical block 20', the second optical block 40' is sandwiched between the first optical block 20' and the sheet metal part 60'. The second optical block 40' is pressed against the first optical block 20' in the Y direction by the spring force of the spring pieces 61. Thus, the position, in the Y direction, of the second optical block 40' with respect to the first optical block 20' is determined. The dimension d4, in the Y direction, from the lower surfaces of the plate parts 62a and 62b to the bottom of the window 65 (see FIG. 12B) is smaller by a predetermined amount than a sum of the dimension d5 from the upper surface 21a of the base part 21 to the lower surface of the protruding part 32 (see FIG. 10B) and the dimension (that is, the thickness) d6, in the Y direction, of the extending part 42 (see FIG. 11B). Accordingly, in the state that the sheet metal part 60' is attached to the first optical block 20', the lower surface 41a of the holding part 41 of the second optical block 40' is pressed against the upper surface 21a of the base part 21 of the first optical block 20'.

The first optical block 20' and the second optical block 40' are assembled with high accuracy. Accordingly, the optical elements 300 mounted on the substrate 200 are optically connected to the optical fibers 400 held by the second optical block 40' with high optical coupling efficiency through an optical path similar to that of the first embodiment.

In the second embodiment as well, the advantageous effects (1) to (4) and (7) described above in the first embodiment are obtained.

In the first and second embodiments, the sheet metal parts 60 and 60' are made of sheet metal. However, the configuration is not limited to the configuration in which the sheet metal parts 60 and 60' are obtained by bending sheet metal. The configuration for obtaining the sheet metal parts (metal parts) 60 and 60' by using a metal member having a spring property is also allowable.

In the first and second embodiments, locking parts (protruding parts) which hook the spring pieces are formed in the first optical block and locked parts (windows) which are hooked on the locking parts are formed on the spring pieces. However, the configurations of the locking part and the locked part are not limited to the above-mentioned configurations.

Figure 14E:
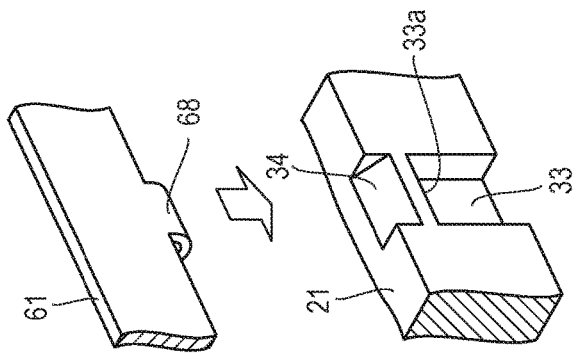
FIG. 14E illustrates the configurations of a locking part of the first optical block and a locked part of the spring piece of the sheet metal part (another configuration 2).
Figure 14F:
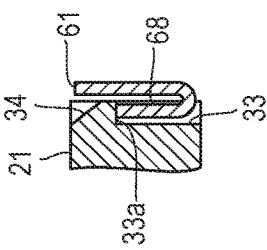
FIG. 14F is a sectional view of the configurations of the locking part of the first optical block and the locked part of the spring piece of the sheet metal part (another configuration 2).
Figure 14C:
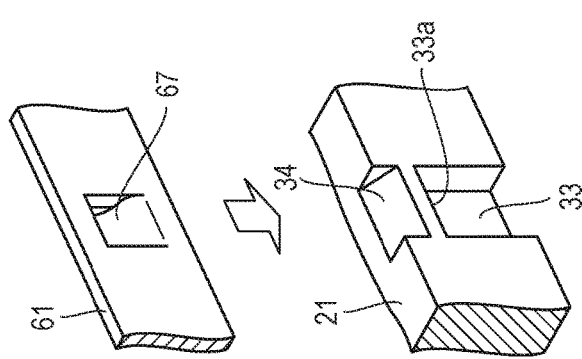
FIG. 14C illustrates the configurations of a locking part of the first optical block and a locked part of the spring piece of the sheet metal part (another configuration 1).
Figure 14D:
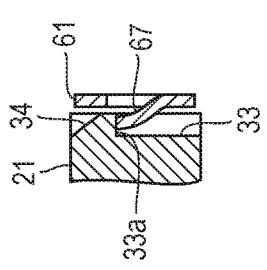
FIG. 14D is a sectional view of the configurations of the locking part of the first optical block and the locked part of the spring piece of the sheet metal part (another configuration 1).
Figure 14A:
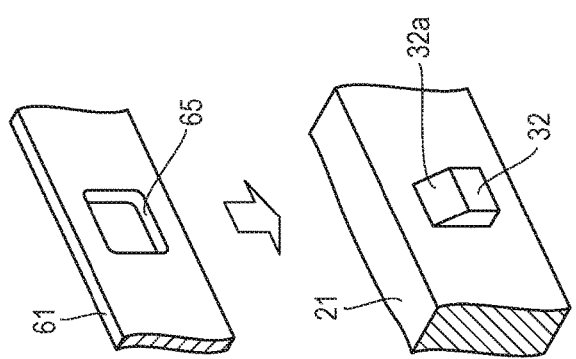
FIG. 14A illustrates the configurations of a locking part of the first optical block and a locked part of a spring piece of the sheet metal part (second embodiment).
Figure 14B:
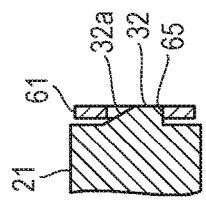
FIG. 14B is a sectional view of the configurations of the locking part of the first optical block and the locked part of the spring piece of the sheet metal part (second embodiment).

FIGS. 14A to 14F illustrate various types of configuration examples of a locking part and a locked part. FIGS. 14A and 14B illustrate the configuration of the second embodiment. FIGS. 14C and 14D illustrate another configuration example 1 and FIGS. 14E and 14F illustrate another configuration example 2. FIGS. 14A to 14F schematically illustrate only chief parts of the spring piece 61 and the base part 21 of the first optical block.

The configuration illustrated in FIGS. 14C and 14D includes a cut and raised piece 67 and a concave part 33. The cut and raised piece 67 is formed by cutting and raising the spring piece 61. The concave part 33 is formed on the base part 21 of the first optical block. The cut and raised piece 67 enters the concave part 33. An end of the cut and raised piece 67 is hooked on an inner wall surface 33a positioned on an upper end of the concave part 33. An inclined surface 34 for facilitating housing of the cut and raised piece 67 in the concave part 33 is formed above the concave part 33.

The configuration illustrated in FIGS. 14E and 14F includes a folded-back piece 68 and the concave part 33. The folded-back piece 68 is formed by extending and folding back the spring piece 61. An end of the folded-back piece 68 is hooked on the inner wall surface 33a positioned on the upper end of the concave part 33.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An optical module which optically connects an optical element with an optical fiber, the optical module comprising:
    a first optical block;
    a second optical block which is assembled with the first optical block; and
    a metal part which is assembled with the first optical block, wherein
    the first optical block is an optical block which is to be mounted on a substrate on which the optical element is mounted,
    the second optical block is an optical block having a configuration to hold the optical fiber,
    the metal part includes two spring pieces which extend in an extending direction orthogonal to an assembling direction, the two spring pieces being mutually connected and the assembling direction being a direction in which the metal part is assembled with the first optical block, hold-down parts are formed on both ends of each of the two spring pieces, in a state that the metal part is assembled with the first optical block, the second optical block is sandwiched between the first optical block and the metal part, in the state that the metal part is assembled with the first optical block, the two spring pieces are located alongside both lateral surfaces of the first optical block, in the state that the metal part is assembled with the first optical block, locking parts formed on the both lateral surfaces of the first optical block are hooked on the two spring pieces, a locked part on which a corresponding one of the locking parts is hooked is formed on a center of each of the two pieces of spring pieces, in the state that the metal part is assembled with the first optical block, the hold-down parts are positioned on the second optical block, and in the state that the metal part is assembled with the first optical block, the second optical block is pressed against the first optical block in the assembling direction by a spring force which is generated when the two spring pieces are hooked on the locking parts.

2. An optical module which optically connects an optical element with an optical fiber, the optical module comprising:

a first optical block;

a second optical block which is assembled with the first optical block; and a metal part which is assembled with the first optical block, wherein the first optical block is an optical block which is to be mounted on a substrate on which the optical element is mounted, the second optical block is an optical block having a configuration to hold the optical fiber, the metal part includes two spring pieces which extend in an extending direction orthogonal to an assembling direction, the two spring pieces being mutually connected and the assembling direction being a direction in which the metal part is assembled with the first optical block, in a state that the metal part is assembled with the first optical block, the second optical block is sandwiched between the first optical block and the metal part, in the state that the metal part is assembled with the first optical block, the two spring pieces are located alongside both lateral surfaces of the first optical block, in the state that the metal part is assembled with the first optical block, locking parts formed on the both lateral surfaces of the first optical block are hooked on the two spring pieces, locked parts on which the locking parts are hooked are formed on both ends of each of the two spring pieces in the state that the metal part is assembled with the first optical block, the second optical block is pressed against the first optical block in the assembling direction by a spring force which is generated when the two spring pieces are hooked on the locking parts.

3. An optical module which optically connects an optical element with an optical fiber, the optical module comprising:

a first optical block;

a second optical block which is assembled with the first optical block; and a metal part which is assembled with the first optical block, wherein the first optical block is an optical block which is to be mounted on a substrate on which the optical element is mounted, the second optical block is an optical block having a configuration to hold the optical fiber, the metal part includes two spring pieces which extend in an extending direction orthogonal to an assembling direction, the two spring pieces being mutually connected and the assembling direction being a direction in which the metal part is assembled with the first optical block, in a state that the metal part is assembled with the first optical block, the second optical block is sandwiched between the first optical block and the metal part, in the state that the metal part is assembled with the first optical block, the two spring pieces are located alongside both lateral surfaces of the first optical block, in the state that the metal part is assembled with the first optical block, locking parts formed on the both lateral surfaces of the first optical block are hooked on the two spring pieces, and in the state that the metal part is assembled with the first optical block, the second optical block is pressed against the first optical block in the assembling direction by a spring force which is generated when the two spring pieces are hooked on the locking parts, a space in which the optical element can be accommodated is formed on a surface of the first optical block, the surface facing the substrate when the first optical block is mounted on the substrate, a reflection surface which reflects light is formed on the first optical block, the reflection surface has an inclination of 45° with respect to the assembling direction, and in a state that the second optical block is assembled with the first optical block, an optical path between the first optical block and the second optical block is parallel to the extending direction and the optical path is included in an optical path between the reflection surface and the optical fiber.

4. The optical module according to claim 1, wherein a space in which the optical element can be accommodated is formed on a surface of the first optical block, the surface facing the substrate when the first optical block is mounted on the substrate, a reflection surface which reflects light is formed on the first optical block, the reflection surface has an inclination of 45° with respect to the assembling direction, and in a state that the second optical block is assembled with the first optical block, an optical path between the first optical block and the second optical block is parallel to the extending direction and the optical path is included in an optical path between the reflection surface and the optical fiber.

5. The optical module according to claim 2, wherein a space in which the optical element can be accommodated is formed on a surface of the first optical block, the surface facing the substrate when the first optical block is mounted on the substrate, a reflection surface which reflects light is formed on the first optical block, the reflection surface has an inclination of 45° with respect to the assembling direction, and in a state that the second optical block is assembled with the first optical block, an optical path between the first optical block and the second optical block is parallel to the extending direction and the optical path is included in an optical path between the reflection surface and the optical fiber.

* * * * *